United States Patent [19]
Li

[11] Patent Number: 5,780,949
[45] Date of Patent: Jul. 14, 1998

[54] RELUCTANCE MACHINE WITH AUXILIARY FIELD EXCITATIONS

[75] Inventor: Yue Li, St. Louis, Mo.

[73] Assignee: Emerson Electric Co., St. Louis, Mo.

[21] Appl. No.: 953,830

[22] Filed: Oct. 13, 1997

Related U.S. Application Data

[63] Continuation of Ser. No. 593,752, Jan. 29, 1996, abandoned.

[51] Int. Cl.$^6$ ................................................ H02K 19/00
[52] U.S. Cl. ........................... 310/198; 310/166; 310/168; 310/180; 318/701
[58] Field of Search ........................ 318/701, 521, 318/523, 529; 310/166, 168, 198, 180, 181

[56] References Cited

U.S. PATENT DOCUMENTS

| | | | |
|---|---|---|---|
| Re. 28,705 | 2/1976 | Hoffmeyer | 310/180 |
| 2,854,596 | 9/1958 | Weixelman et al. | 310/168 |
| 3,041,486 | 6/1962 | Moffitt | 310/168 |
| 3,204,167 | 8/1965 | Zigler | 310/168 |
| 3,518,473 | 6/1970 | Nordebo | 310/168 |
| 3,564,312 | 2/1971 | Bunea | 310/168 |
| 3,593,051 | 7/1971 | Akbar | 310/166 |
| 3,612,988 | 10/1971 | Wanlass | 323/43.5 R |
| 3,648,206 | 3/1972 | Wanlass | 336/160 |
| 3,679,962 | 7/1972 | Wanlass | 321/18 |
| 3,679,966 | 7/1972 | Wanlass | 323/56 |
| 3,704,402 | 11/1972 | Leigeb | 310/166 |
| 3,881,146 | 4/1975 | Wanlass | 321/2 |
| 3,956,678 | 5/1976 | Byrne et al. | 310/168 |
| 3,995,203 | 11/1976 | Török | 318/166 |

(List continued on next page.)

FOREIGN PATENT DOCUMENTS

| | | | |
|---|---|---|---|
| 0573198A1 | 5/1993 | European Pat. Off. | H02P 6/02 |
| 3003699 | 1/1991 | Japan | H02P 8/00 |
| 4281390 | 10/1992 | Japan | H02P 7/00 |
| 2159672 | 12/1985 | United Kingdom. | |
| 2167914 | 6/1986 | United Kingdom. | |
| 2275836 | 7/1994 | United Kingdom. | |

OTHER PUBLICATIONS

Miller, *Switched Reluctance Drives* pp. 3–69.
Miller, *Switched Reluctance Drives: a Reference Book of Collected Papers*, pp. 320–323, Oct. 1988, Intertec Coommunications Inc. (USA).
Vukosavic and Stefanovic, *SRM Inverter Topologies: A Comparative Evaluation*, IEEE Transactions on Industry Applications, vol. 27, No. 6, Nov./Dec. 1991.
1968 Wescon Technical Papers, "New Directions in Linear Microcircuits," Western Electric Show and Conventions, Aug. 20–23, 1968.
Llang, et al., *A New Variable Reluctance Motor Utilizing An Auxiliary Commutation Winding*, pp. 423–432, IEEE Proc. (1994).
Stephenson and Blake, *The Characteristics, Design and Applications of Switched Reluctance Motors and Drives*, (Jun. 1993, Nuremberg, Germany).
Li, et al., *A Doubly Salient Permanent Magnet Motor Capable of Field Weakening*, U. of Wisconsin –Madison, Dept. of Electrical and Computer Eng.
Llang, et al., *A New Variable Reluctance Motor Utilizing an Auxiliary Commutation Winding*, pp. 219–225.
Li, et al., *A Doubly Salient Doubly Excited Variable Reluctance Motor*, pp. 137–143, U. of Wisconsin –Madison, Dept. of Electrical and Computer Eng.
Pulle, *Performance of Split–Coil Switched Reluctance Drive*, pp. 318–323, IEE Proc., vol. 135, Pt. B, No. 6, 1988.
Introduction to "Switched Reluctance Motors and Their Control," p. 1.

*Primary Examiner*—Steven L. Stephan
*Assistant Examiner*—B. Mullins
*Attorney, Agent, or Firm*—Arnold, White & Durkee

[57] ABSTRACT

A reluctance machine system including a reluctance machine having a rotor and a stator including at least one phase winding and a full pitch auxiliary filed winding where constant currents are established in the auxiliary field winding to assist in the establishment of a magnetic field in the machine so as to improve the machine's performance.

31 Claims, 9 Drawing Sheets

U.S. PATENT DOCUMENTS

| | | | |
|---|---|---|---|
| 4,063,135 | 12/1977 | Wanlass | 312/220 A |
| 4,095,149 | 6/1978 | Wanlass | 310/22 A |
| 4,132,932 | 1/1979 | Wanlass | 318/795 |
| 4,134,055 | 1/1979 | Akamatsu | 318/696 |
| 4,152,630 | 5/1979 | Wanlass | 318/796 |
| 4,187,457 | 2/1980 | Wanlass | 318/729 |
| 4,228,387 | 10/1980 | Brown | 318/696 |
| 4,321,518 | 3/1982 | Akamatsu | 318/696 |
| 4,338,557 | 7/1982 | Wanlass | 318/729 |
| 4,348,605 | 9/1982 | Toeroek | 310/168 |
| 4,387,326 | 6/1983 | Ray et al. | 318/138 |
| 4,446,416 | 5/1984 | Wanlass | 318/812 |
| 4,628,245 | 12/1986 | Quayle | 310/198 |
| 4,642,543 | 2/1987 | MacMinn | 318/696 |
| 4,670,696 | 6/1987 | Byrne et al. | 318/701 |
| 4,684,867 | 8/1987 | Miller | 318/701 |
| 4,736,151 | 4/1988 | Dishner | 323/224 |
| 4,740,738 | 4/1988 | El-Antably et al. | 318/701 |
| 4,855,652 | 8/1989 | Yamashita | 318/268 |
| 4,884,185 | 11/1989 | Hubert | 363/56 |
| 5,072,166 | 12/1991 | Ehsani | 318/696 |
| 5,113,113 | 5/1992 | Tepavcevic | 318/701 |
| 5,115,181 | 5/1992 | Sood | 318/701 |
| 5,187,427 | 2/1993 | Erdman | 323/207 |
| 5,231,342 | 7/1993 | Bahn | 318/696 |
| 5,235,504 | 8/1993 | Sood | 363/53 |
| 5,291,106 | 3/1994 | Murty et al. | 318/375 |
| 5,304,882 | 4/1994 | Lipo et al. | 310/156 |
| 5,319,297 | 6/1994 | Bahn | 318/701 |
| 5,355,069 | 10/1994 | Bahn | 318/701 |
| 5,373,195 | 12/1994 | De Doncker et al. | 307/45 |
| 5,373,223 | 12/1994 | Akagi et al. | 318/722 |
| 5,376,851 | 12/1994 | Lipo et al. | 310/179 |
| 5,376,867 | 12/1994 | Capetti | 318/376 |
| 5,410,203 | 4/1995 | Lürkens | 310/163 |
| 5,424,624 | 6/1995 | Senak, Jr. | 318/701 |
| 5,449,993 | 9/1995 | Davis | 318/701 |
| 5,455,473 | 10/1995 | Lipo et al. | 310/114 |
| 5,459,385 | 10/1995 | Lipo et al. | 318/701 |
| 5,463,299 | 10/1995 | Futami et al. | 318/618 |
| 5,545,938 | 8/1996 | Mecrow | 310/156 |

RELUCTANCE MACHINE WITH AUXILIARY FIELD EXCITATIONS

This application is a continuation of application Ser. No. 08/593,752, filed Jan. 29, 1996 now abandoned.

FIELD OF THE INVENTION

This invention relates to reluctance machines and machine systems and, in particular, to switched reluctance motors and motor systems. More particularly, the present invention relates to a method and apparatus for improving the performance of a switched reluctance machine through the use of auxiliary field excitations.

BACKGROUND OF THE INVENTION

In general, a reluctance machine is an electric machine in which torque is produced by the tendency of a movable part to move into a position where the inductance of an energized phase winding is maximized. In one type of reluctance machine the energization of the phase windings occurs at a controlled frequency. These machines are generally referred to as synchronous reluctance machines. In another type of reluctance machine, circuitry is provided for detecting the position of the movable part (generally referred to as a "rotor") and energizing the phase windings as a function of the rotor's position. These types of machines are generally known as switched reluctance machines. The present invention is applicable to both synchronous and switched reluctance machines.

The general theory of the design and operation of reluctance machines in general, and switched reluctance machines in particular, is known in the art and is discussed, for example, in Stephenson and Blake, "The Characteristics, Design and Applications of Switched Reluctance Motors and Drives", Presented at the PCIM '93 Conference and Exhibition at Nuremberg, Germany, Jun. 21–24, 1993.

As explained above, the basic mechanism for torque production in a reluctance motor is the tendency of the rotor to move into a position to increase the inductance of the energized phase winding. In general, the magnitude of the torque produced by this mechanism corresponds to the magnitude of the current in the energized phase winding such that the motor torque is heavily dependent on the phase current waveforms. For an ideal motor with no magnetic saturation, the instantaneous torque T is:

$$T = 1/2 i^2 \frac{dL}{d\theta}$$

Where i is the instantaneous current in the energized phase winding and $dL/d\theta$ is the derivative of the phase inductance L with respect to the rotor position $\theta$. While all practical reluctance motors have some magnetic saturation this equation is useful for purposes of the present analysis.

For ideal torque production the phase energization currents would be substantially rectangular with each phase current terminating at the point the next phase current is initiated. In practice, rectangular phase currents are not obtainable and the ideal practical phase current waveforms are trapezoidal. The rate of change of the phase energization current is limited by the back emf generated by the rotating rotor since:

$$\frac{di}{dT} \propto \frac{V_{DC} - E_{mf}}{L}$$

where $V_{dc}$ is the DC bus voltage of the power converter that provides the phase energization current, $E_{mf}$ is the back emf of the motor, and L is the inductance of the excited phase winding.

At high rotational speeds, the back emf produced by the rotating rotor $E_{mf}$ can significantly limit the ability of the power converter to provide trapezoidal energization currents. At these speeds the phase energization currents can become more triangular than trapezoidal.

These triangular phase energization currents can significantly diminish the performance of the motor. In particular, the triangular currents produce increased torque ripple and, as such, increased motor noise and vibration. Also, because of the decrease in the average phase excitation current, the power density, the performance and efficiency of the motor can be adversely affected.

In traditional reluctance machine systems the degradation of machine performance at high rotor speeds is often either ignored, avoided by avoiding high speed operation, or compensated for by increasing the DC bus voltage of the power converter. None of these "solutions" to the performance degradation are ideal. Ignorance and avoidance sidesteps the problem, and increasing the power rating of the converter both increases the overall costs of the system (by requiring higher voltage devices) and tends to decrease the overall efficiency of the system.

One suggested approach to improving the phase current waveforms was presented in U.S. Pat. No. 5,459,385. In this approach, a full-pitch commutation winding is placed in the stator of a reluctance motor and the commutation winding is coupled to the phase windings such that, upon commutation of an energized phase winding, the commutation winding absorbs, through mutual inductance, some or all of the energy stored in the magnetic field established by the energized winding. This transference of energy is purported to force the current in the commutated phase winding to drop to zero faster, thus allowing the commutation of the phase winding to occur closer to the ideal point of rotor pole/stator pole alignment. While this approach may have some advantages, it results in an commutation winding that is energized by discontinuous currents, where the current pulses applied to the commutation winding occur at the commutation points of the phase windings. These current discontinuities can result in significant flux changes in the motor which can negatively impact the motor's performance. Moreover, in these machines, the commutation winding acts as an essentially "parasitic" device in that it absorbs and, potentially stores, energy from the motor. It does not provide any significant useful energy to the motor.

It is an object of the present invention to overcome the referenced limitations, and other limitations, in the prior art by providing an increased performance reluctance machine system that has improved phase energization current waveforms; reduced noise and vibration; improved power density; and improved performance in terms of efficiency over traditional reluctance machines. It is a further object of the present invention to accomplish these improvements without significantly increasing the power rating of the converter used in the system.

SUMMARY OF THE INVENTION

In accordance with an exemplary embodiment of the present invention a reluctance machine system is provided that comprises a reluctance machine having a rotor defiing a plurality of rotor poles, a stator defining a plurality of stator poles, a plurality of phase windings, and a full pitch auxiliary field winding. The auxiliary field winding is energized in such a manner that continuous currents are established in the auxiliary winding. These continuous currents contribute to the establishment of the magnetic field within the machine and improve the machine's performance.

In one embodiment of the present invention, the reluctance machine is a three phase machine and includes N*6 stator poles and N*4 rotor poles, where N is an integer. In other embodiments of the present invention the reluctance machine is a four phase machine having N*8 stator poles and N*6 rotor poles.

Various power converters may be used in conjunction with the reluctance machine of the present invention to establish continuous currents in the auxiliary field winding. In one exemplary embodiment the auxiliary field winding is coupled across the DC bus of a standard power converter. A variable resistor or a power switching device may be placed in series with the auxiliary field winding so that the magnitude of the current in the auxiliary field winding may be regulated. In a still further embodiment of the present invention a bi-polar power converter is used to provide a currents of opposite polarities to the phase windings to increase the torque production of the reluctance machine system.

BRIEF DESCRIPTION OF THE DRAWINGS

Similar reference characters indicate similar parts throughout the several views of the drawings.

DETAILED DESCRIPTION OF THE INVENTION

Figure 1:
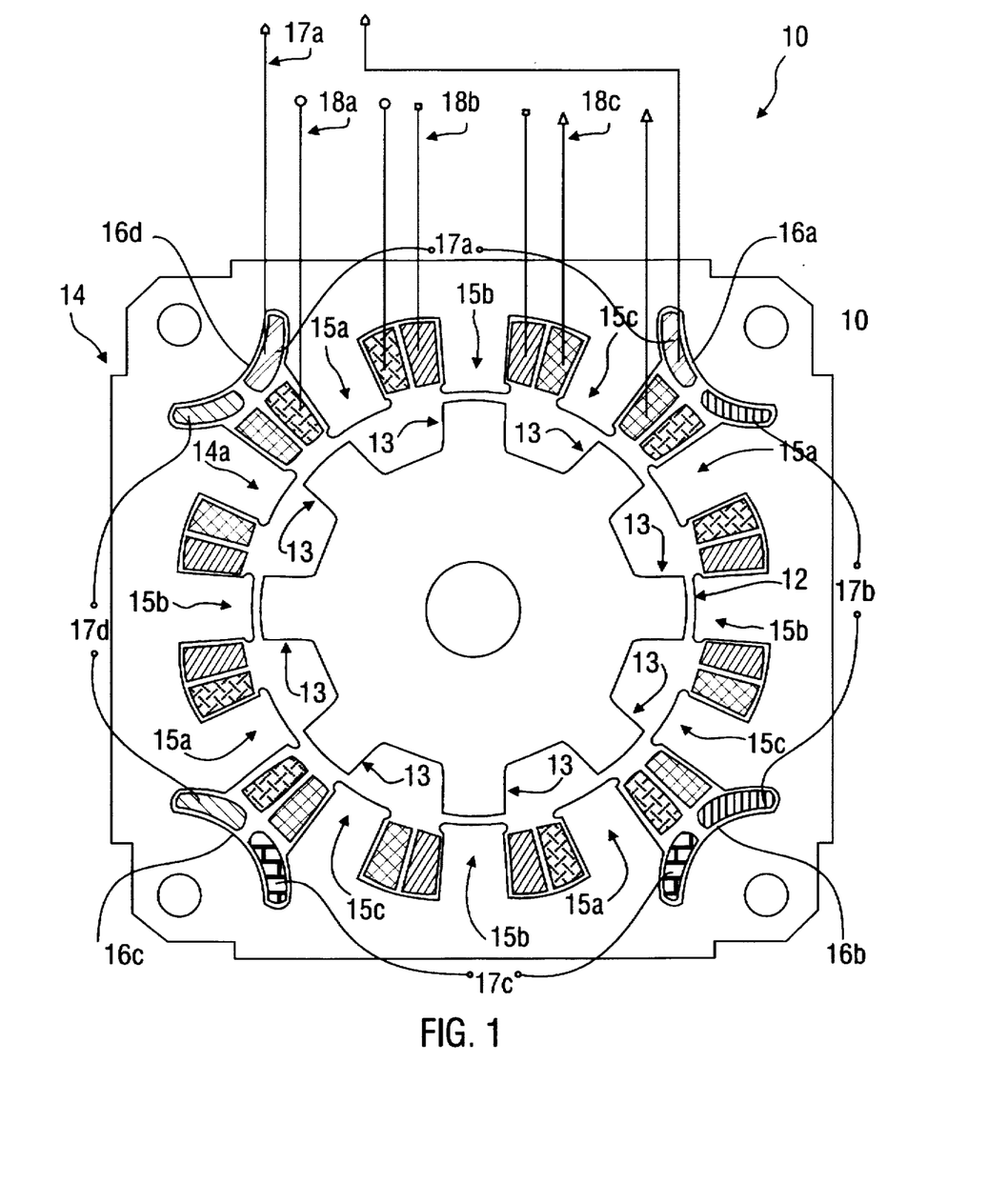
FIG. 1 illustrates a cross-sectional view of a reluctance machine in accordance with the present invention.

Turning to the drawings and, in particular FIG. 1, a cross sectional view of a reluctance machine 10 in accordance with the present is provided. In general, the machine 10 comprises a rotor 12 having eight evenly spaced rotor poles 13 and a stator 14 having twelve evenly spaced stator poles 15a, 15b and 15c, where each stator pole set comprises four stator poles.

The rotor 12 may be of standard construction and may consist, for example, of stack of identical steel rotor laminations.

The stator 14 may be constructed from a stack of identical steel stator laminations in accordance with standard techniques with one significant exception. Four of the slots that define the stator poles, slots 16a, 16b, 16c and 16d, are modified by deepening to provide additional spacing to accommodate auxiliary filed coils 17a, 17b, 17c and 17d which are placed into the Y-shaped spaces defined by the modified slots 16a–16d. Each of the auxiliary field coils comprises a coil of copper that is positioned within the deepened slots 16a–16d such that each coil encircles three stator poles.

Because the machine of FIG. 1 is a three phase, eight rotor pole machine, each of the auxiliary field coils 17a–17d is a "full pitch" coil in that it spans 360° electrical degrees. In other words, a full pitch winding includes winding coils that surround N stator poles where N is an integer and where N is equal to the number of phase windings (or phases) in the machine. This is true for phase windings that are comprised of coils where each coil surrounds a single stator pole.

The auxiliary field coils 17a–17d may be connected in series, parallel, or a combination of series and parallel (e.g., the parallel connection of 17a and 17b in series with the parallel connection of 17c and 17d). In the embodiment of FIG. 1, the auxiliary field coils are connected in series to provide a single auxiliary field winding.

Three phase windings 18a, 18b and 18c are associated with the three stator pole sets 15a–15c and are placed in the slots defined by the stator poles 15. In general, each phase winding comprises four coils of copper wire where each coil within a phase winding is positioned around one of the stator poles 15 that comprise the stator pole set associated with that phase winding. The four coils that comprise a phase winding may be connected in series or in parallel or a combination of series and parallel. In the embodiment of FIG. 1, the phase winding coils are connected in series to provide three separately energizable phase windings 18a, 18b and 18c.

When constructing a stator such as stator 14 in FIG. 1, the winding coils comprising the auxiliary field coils 17a–17d should be positioned within the stack of stator laminations before the coils comprising the phase windings 18a–18c are positioned in the stator stack.

In traditional reluctance machines, the phase energization current flowing in the phase windings performs two basic function: (i) it serves to establish the magnetic field of the machine; and (ii) it serves to interact with the established magnetic field to produce torque. These roles of the phase energization current and their impact on the total torque production of the machine may be mathematically expressed as follows:

$$T = T_a + T_b + T_c = 1/2 i_a^2 \frac{dL_a}{d\theta} + 1/2 i_b^2 \frac{dL_b}{d\theta} + 1/2 i_c^2 \frac{dL_c}{d\theta}$$

Since $L_a = N_a^2 P_a$; $L_b = N_b^2 P_b$ and $L_c = N_c^2 P_c$ (where $N_p$ is the number of turns of the associated phase winding p and $P_p$ is the permeance of the associated phase winding p):

$$T = 1/2 i_a N_a \frac{dP_a}{d\theta} (i_a N_a) + 1/2 i_b N_b \frac{dP_b}{d\theta} (i_b N_b) + 1/2 i_c N_c \frac{dP_c}{d\theta} (i_c N_c)$$

For analyitical purposes, the above equation may be interpreted to show that, for each phase P, a portion of the phase energization current $N_p i_p$ goes to establishing the magnetic field of the (machine and a portion $$i_p N_p \frac{dN_p}{d\theta}$$

goes to interacting with this field to produce torque.

In the motor of FIG. 1, unlike in traditional reluctance motors, the auxiliary field winding also plays a role in the establishment of the magnetic field of the machine. This is particularly true when continuous currents are established in the auxiliary winding. Referring back to FIG. 1, it may be noted that each auxiliary field coil 17a–17d encircles three stator poles where each of the three stator poles is surrounded by a coil from one of the phase windings 18a–18c. As such, there is some mutual inductance between each auxiliary field coil and the phase windings 18a–18c. Thus, when a phase winding and the auxiliary field winding are energized simultaneously, there will be a torque producing contribution provided by the change in inductance of the phase winding and a torque producing contribution provided by the change in the mutual inductance between the phase and auxiliary windings. Mathematically, this total torque can be represented on a per-phase basis as:

$$T_{phase} = 1/2 i_p^2 \frac{dL_p}{d\theta} + 1/2 i_p i_f \frac{dL_{pf}}{d\theta} + 1/2 i_f i_p \frac{dL_{fp}}{d\theta}$$

Assuming that that mutual inductance between the phase winding and the auxiliary winding is the same as the mutual inductance between the auxiliary winding and the phase winding, then the per-phase torque for the motor of FIG. 1 can be represented as:

$$T_{phase} = 1/2 i_p^2 \frac{dL_p}{d\theta} + i_p i_f \frac{dL_{pf}}{d\theta}$$

From an analysis of the above equation, it may be noted that for a given phase energization current i, and an arbitrary continuous field current if, the total torque produced by the motor of FIG. 1 will be greater than that obtainable from a standard reluctance machine with the same phase current. Since $$\frac{dL}{d\theta} = \frac{N^2 dP_f}{d\theta} \text{ and } \frac{dL_{pf}}{d\theta} = N_p N_f \frac{dP_p}{d\theta},$$

the total phase current may be represented as:

$$T_{phase} = 1/2 i_p N_p \frac{dP_p}{d\theta} (i_p N_p) + i_p N_p \frac{dP_p}{d\theta} i_f N_f$$

If it is assumed that the number of turns in the auxiliary field winding is the same as that of the phase winding (i.e., $N_a=N_f$) and that the magnitude of the phase energization current is the same as the magnitude of the continuous current in the auxiliary field winding (i.e., $i_p=i_f$) the above equation indicates that the motor of FIG. 1 provides approximately three times the power density of a standard reluctance machine with the same phase energization currents, since:

$$T_{(standard)} = 1/2 i_p^2 \frac{dL_p}{d\theta}$$

$$T(FIG. 1) = 1/2 i_p^2 \frac{dL_p}{d\theta} + i_p^2 \frac{dL_p}{d\theta} = \frac{3}{2} i^2 \frac{dL_2}{d\theta}$$

$$\frac{T_{(FIG. 1)}}{T_{(Standard)}} = 3$$

The above equations are exemplary only in that it is unlikely that the magnetic flux of a standard machine can reach three times its normal maximum magnitude. Nonetheless, the calculations above indicate that the reluctance machine of FIG. 1 can provide improved torque densities for the same phase current magnitudes. Alternately, the above calculations indicate that, using a machine constructed in accordance with FIG. 1, the same currents (and thus the same power converter) used with a standard reluctance machine can be used to drive a larger machine constructed in accordance with FIG. 1 to provide increased torque output. Still further, given the same currents, the same torque output can be provided for a phase winding with fewer turns (i.e., a smaller $N_p$). Such a reduction in the number of turns would provide a lower inductance this allowing the current to change more rapidly over time and allowing for a better current waveform and faster torque response. This reduction in the phase inductance could also reduce the copper losses of the machine.

In addition to allowing a given magnitude of phase energization currents to provide increased torque output, the machine of FIG. 1 can allow for a smaller (and thus less costlier) power converter to provide a given output torque than was previously possible with standard reluctance machines. If it is assumed, as before, that the number of turns of the field winding is the same as that of the phase winding and that the field current is the same as that of the phase energization currents, then the relationship between the per-phase torque available from a standard reluctance machine and the machine of FIG. 1 can be expressed as:

$$3/2 i_p^2 \frac{dL_p}{d\theta} = 1/2 i_{p(std)}^2 \frac{dL_p}{d\theta}$$

Solving for $i_p$ it may be demonstrated that, for the same torque output, only $$\frac{1}{\sqrt{3}} i_{p(std)}$$

is required using a machining accordance with FIG. 1. This reduction in the required phase energization current for the same torque output allows for the use of smaller power converters that would otherwise be required and allows for an overall improvement in motor efficiency since the $I^2R$ losses resulting from the phase energization currents are also reduced.

Still further, for a given power converter rating or given DC bus voltage, the machine of FIG. 1 allows for faster torque response, reduced torque ripple and better phase current waveforms that would be available with a standard machine. Alternately, the same torque response and motor performance can be obtained with a power converter comprising lower current rated switching devices and with a lower DC bus voltage that would otherwise be possible.

Based on the above it can be determined that, for increased torque purposes, the magnitude of the auxiliary field current should be positive and, for a relatively constant torque output, continuous. The use of such a continuous auxiliary filed current tends to establish a relatively constant level of magnetic flux in the machine, thus reducing the extent of flux variations and thus the iron losses that such flux variations can produce.

Figure 2A:
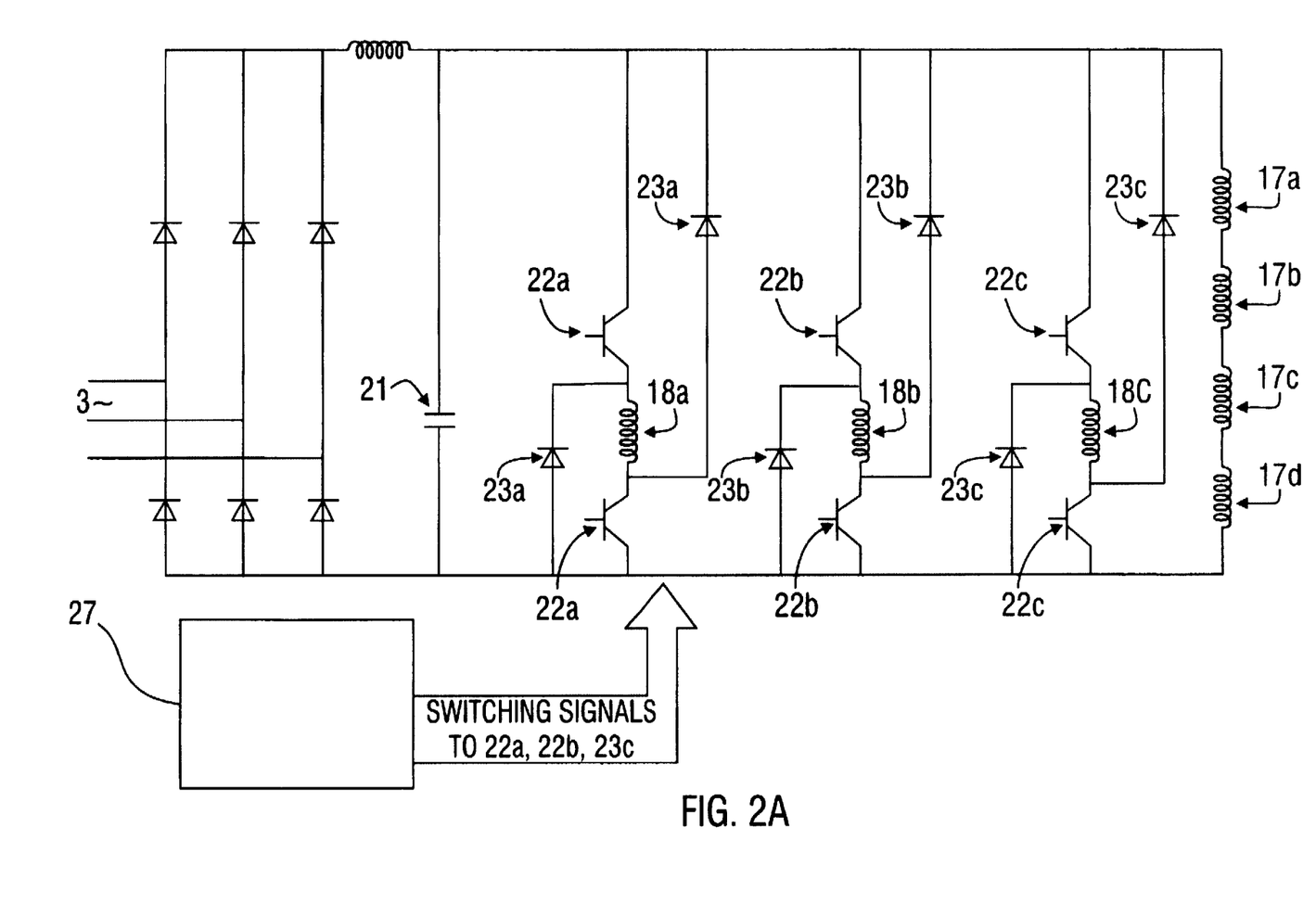
FIGS. 2a and 2b illustrate power converters for energizing the machine of FIG. 1 and for providing continuous auxiliary field excitation currents.

FIG. 2a illustrates a power converter 20 than can be used in conjunction with the reluctance machine 10 of FIG. 1. Power converter 20 is similar to standard power converters used with reluctance machines in that two power switching devices 22a–22c, and two anti-parallel diodes 23a–23c are coupled to each of the phase windings 15a–15c and the power converter's DC bus. In the power converter of FIG. 2, the DC bus is established across a DC capacitor 21. A switching circuit 27 is provided for detecting the position of the rotor with respect to the stator and energizing the phase windings as a function of the rotor's position. The precise construction of switching circuit 27 will vary with the application of the system. It may be constructed using standard switching cirucits known to those skilled in the relevant art.

Unlike a standard power converter, which generally consists of the switches 22 and diodes 23, the power converter 20 also includes circuitry for coupling the auxiliary field winding comprising coils 17a–17c in series across the DC bus.

When the power controller 20 of FIG. 2a is used with a reluctance machine, of the type illustrated in FIG. 1, the magnitude of the current in the auxiliary field winding will be fairly constant (assuming the DC bus voltage is constant) and the auxiliary field current will be continuous. This auxiliary field current can be set by selecting the resistance of the total auxiliary field winding such that the current through the winding, when coupled to the constant DC bus voltage, is the desired current. The resistance of the total auxiliary field winding can be established through standard motor winding design techniques by properly selecting the number of turns in the auxiliary filed winding. In general, the higher the number of turns, the higher the resistance of the auxiliary field winding and the lower the total auxiliary field current.

Figure 2B:
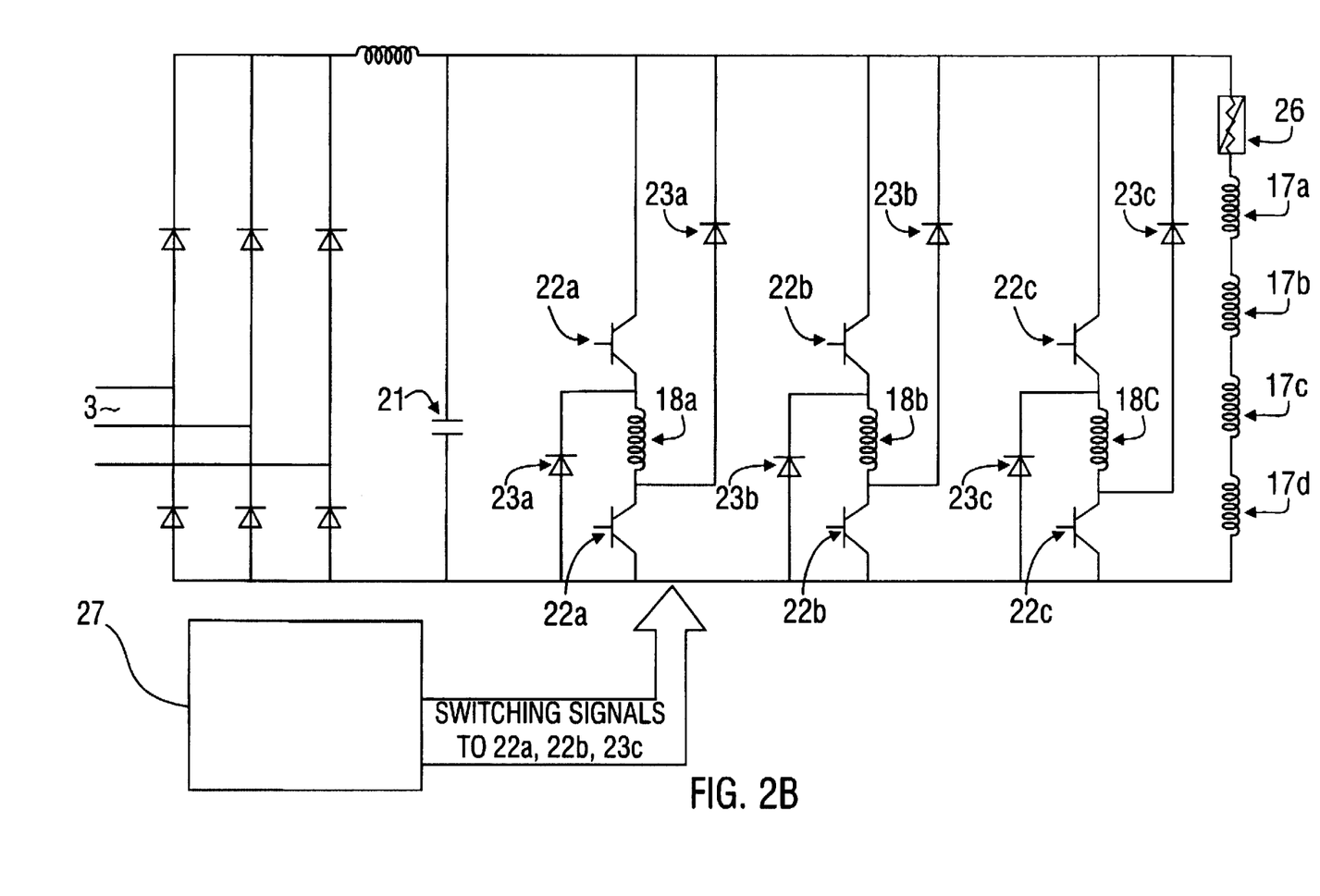

An alternate power converter arrangement for providing constant auxiliary field current is illustrated in FIG. 2b. This power converter is similar to the one of FIG. 2a with the exception that a variable resistor 26 is connected in series between one terminal of the auxiliary field winding and the DC bus. In this arrangement, the magnitude of the auxiliary field current can be controlled by adjusting the resistance of variable resistor 26.

As indicated above, for most applications, optimum machine performance can be established when the auxiliary field current is continuous and of a constant magnitude such that the flux contribution from the auxiliary winding is constant. It has been found that, when constant auxiliary field current it used, improved machine performance can be obtained when the magnitude of the auxiliary field current is such that the stator core is magnetically saturated when the auxiliary phase winding is energized and the peak air-gap flux is on the order of 1.0–1.5 Teslas. The precise current magnitudes necessary to achieve these results will vary from machine to machine and can be determined through the use of finite element analysis or empirical testing of a given machine.

Present analysis suggests that, for purposes of machine efficiency, there is an optimum auxiliary field current point such that adjustment of the auxiliary field current above or below this point causes a decrease in overall machine efficiency. This optimum auxiliary field current point may be determined empirically through testing of an actual motor or through the use of finite element analysis.

Figure 3:
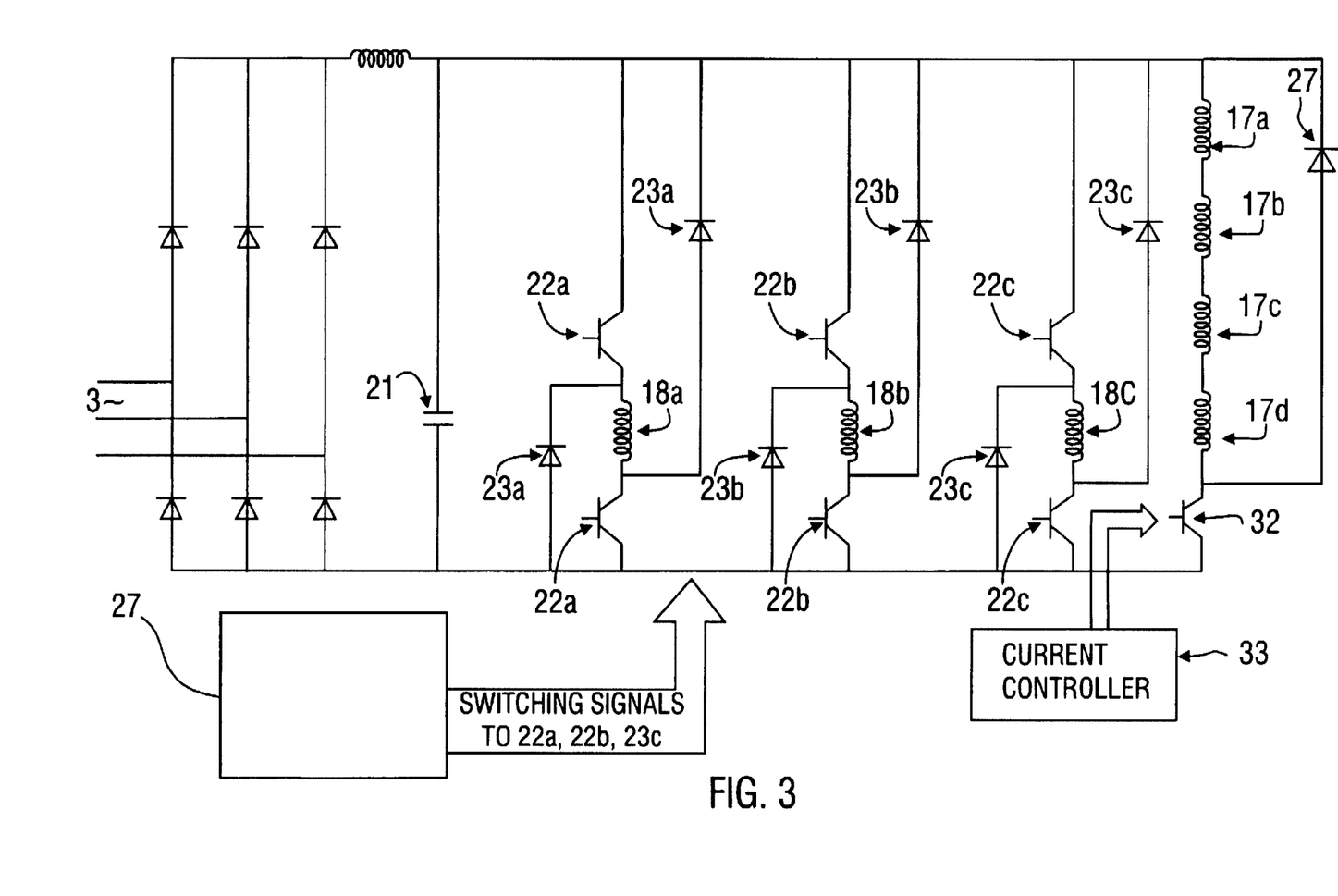
FIG. 3 illustrates a power converter for energizing the reluctance machine of FIG. 1 that allows for regulation of the continuous auxiliary field excitation currents.

In certain applications it may be desirable to control the magnitide of the auxiliary field current to control the magnetic flux of the machine. FIG. 3 illustrates a power converter 30 that allows for regulation of the auxiliary field current. In general, the power converter 30 is simliar to power converter 20 of FIG. 2a, with the exception of a power switching device 32 coupled in series between the auxiliary phase winding and the DC bus. A feedback diode 27 is also added to provide a freewheeling current path. Through the use of known current techniques (e.g., pulse width modulation, pulse frequency modulation, bang-bang current control and the like) it is possible to use the converter of FIG. 3 to control the current in the auxiliary field winding and thus the magnetic flux of the machine.

The power converter 30 of FIG. 3 allows for the construction of a simple and elegant reluctance machine system where the torque output of the reluctance machine is controlled solely by controlling the current in the auxiliary phase winding. In such a system, the phase switching devices 32 are switched ON or OFF and are used only for commutation purposes and not to regulate the current level in the phase windings. As such, the switching circuitry for the switching devices 22 can be relatively simple compared to the complex phase current control circuits often used in standard reluctance system. To allow for torque control, circuitry 33 is provided for controlling the switching of switching device 32 as a function of a parameter intended to be controlled (e.g., rotor speed, torque, etc.). Standard feedback and control techniques may be used to construct switching circuit 33.

For many applications the power converter of FIG. 3 can be used to control the torque of the motor by maintaining the rotational period over which the phase windings are energized constant and regulating the magnitude of the energization current in the auxiliary winding. For other applications, torque control can be accomplished by both adjusting the rotational period over which the phase windings are enegized and regulating the energization current in the auxiliary field winding. In either event, the system of FIG. 3 allows for variable torque control without regulating the current in the phase windings.

The simple control scheme of FIG. 3 is believed to be beneficial in that it allows for variable torque control without the need for complex control circuitry.

The current control scheme of FIG. 3 is representative of the types of current control circuits that may be used with a reluctance machine constructed in accordance with the teachings of this disclosure. Alternate control schemes can be used. For example, the power switching device 32 could be coupled between the positive rail of the DC bus and the auxiliary field winding, or upper and lower switching devices could be used. Thus, it is possible for one to vary from the specific control scheme of FIG. 3 and still appropriate the spirit and essence of the present invention.

The reluctance machine of FIG. 1 and the controllers of FIGS. 2a–2b and 3 were described in the general context of a 12/8 reluctance machine. The use of auxiliary field windings is not limited to this particular stator pole/rotor pole combination and such windings may be used with a number of different reluctance machines. For example, FIG. 4 illustrates the use of an auxiliary field winding in the context of a 6 stator pole/4 rotor pole reluctance machine.

Figure 4:
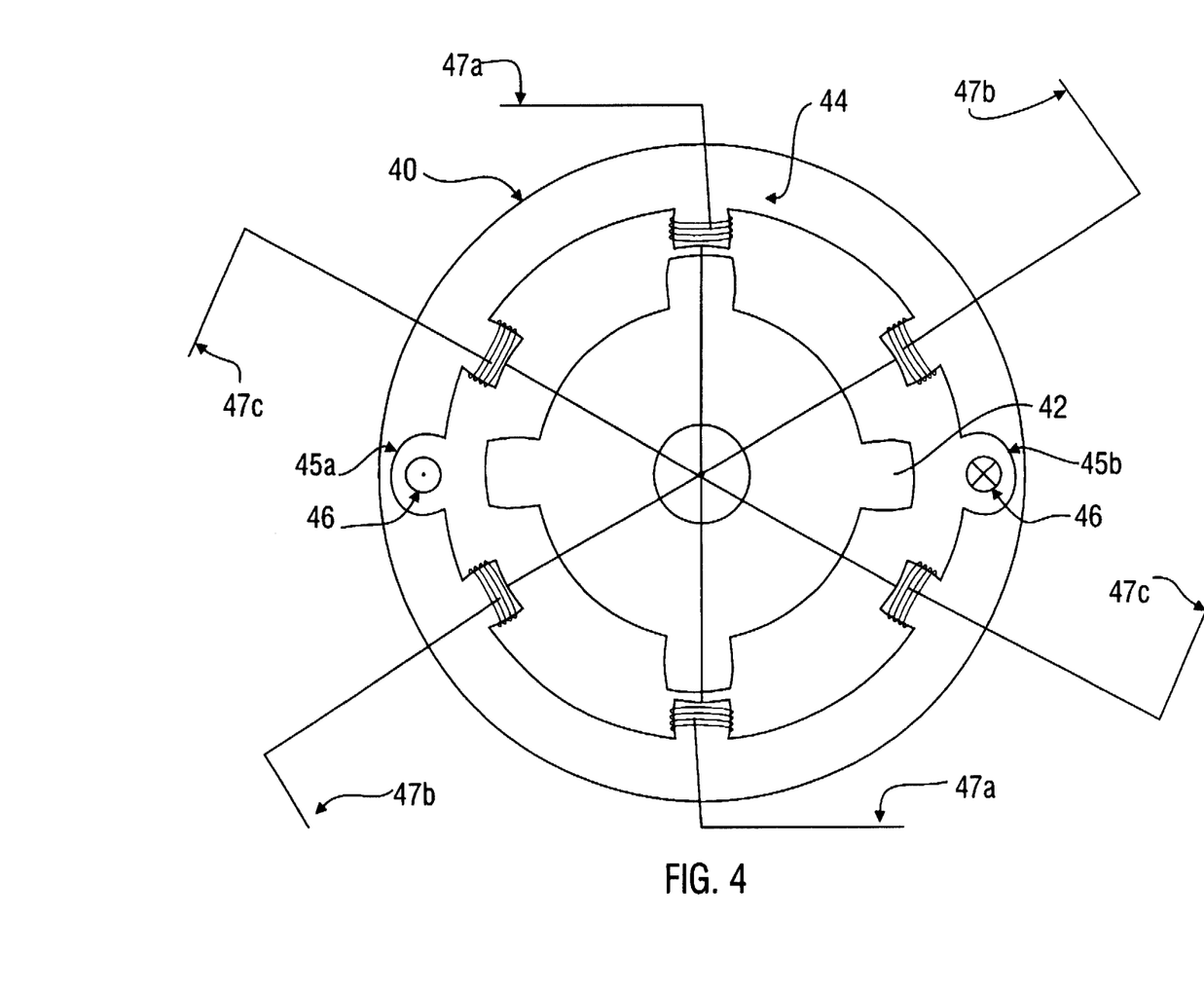
FIG. 4 illustrates a cross-sectional view of an alternate embodiment of a reluctance machine in accordance with the present invention having six stator poles and four rotor poles.

The machine 40 of FIG. 4 comprises a four pole rotor 42 that may be constructed according to known techniques. The stator 44 is of essentially standard construction except that two slots of the stator 45a and 45b have been modified by deepening to accommodate an auxiliary field winding 46. In the particular example of FIG. 4, auxiliary field winding 46 comprises a single coil. In the machine arrangement of FIG. 4 the auxiliary filed winding 46 is a full pitch winding in that the coil defining the winding spans 360° electrical, and in that the coil comprising the winding surrounds three stator pole in the three phase machine. Three phase windings 47a, 47b and 47c surround the stator poles in a traditional fashion.

The machine of FIG. 4 may be controlled using power converters similar to those illustrated in FIGS. 2a, 2b and 3 which establish a continuous current in the auxiliary winding.

Figure 5:
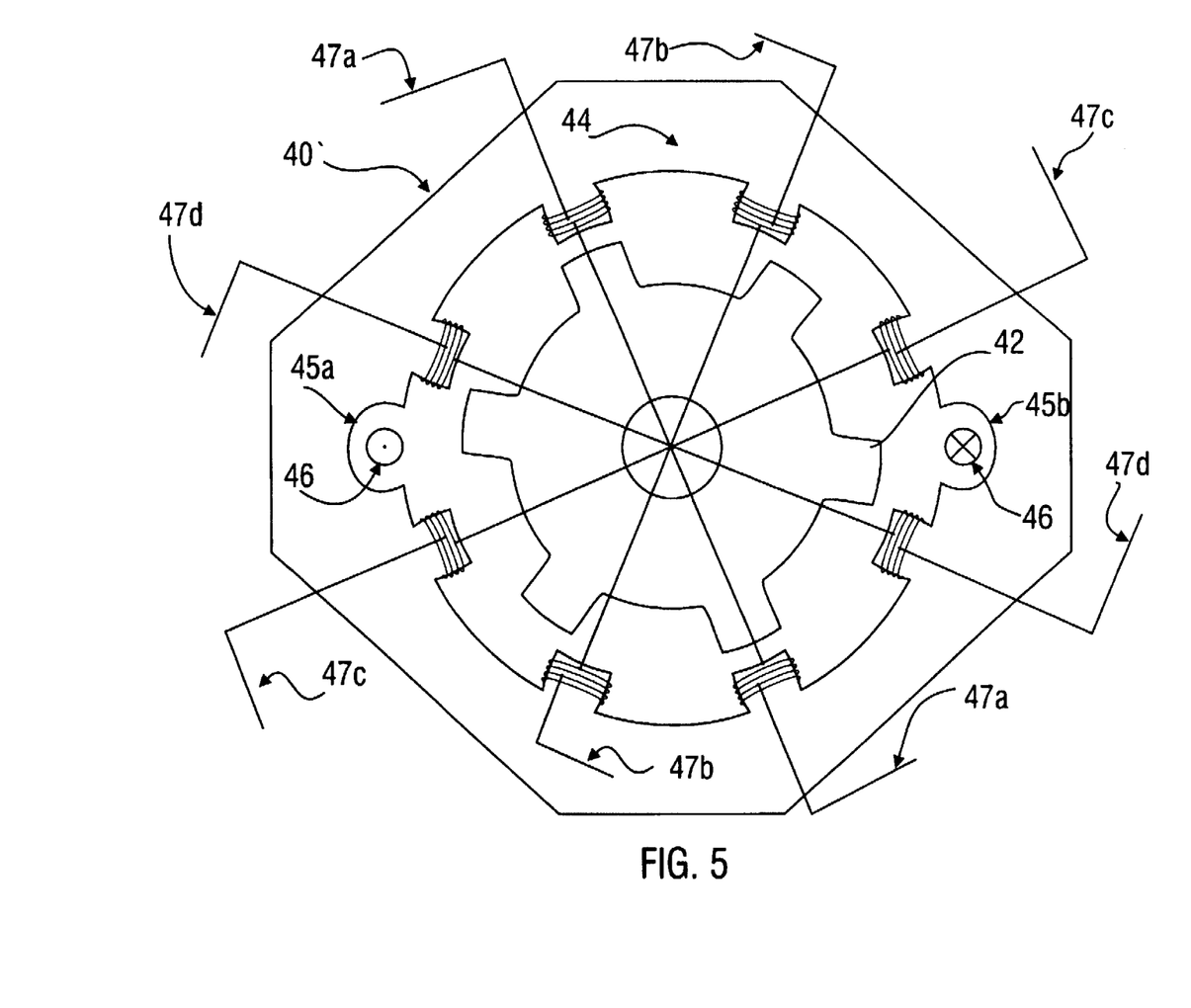
FIG. 5 illustrates a cross-sectional view of yet an alternate embodiment of a reluctance machine in accordance with the present invention having eight stator poles and six rotor poles.

FIG. 5 illustrates a reluctance machine designed in accordance with the teachings of the present disclosure that includes a stator 44' having eight stator poles and rotor 42' having six rotor poles. Unlike the machines of FIGS. 1 and 4, the machine of FIG. 5 is a four phase machine as there are four phase windings 47a–47d. Each of the phase windings comprises two coils surrounding diametrically opposite stator poles. An auxiliary winding 46' surrounds four stator poles. Since the machine of FIG. 5 is a four phase machine, the auxiliary winding is a full pitch winding.

While FIGS. 1, 4 and 5 illustrate 12/8, 6/4 and 8/6 machines in accordance with the present invention, the present invention is not so limited and the principals disclosed herein can be used to construct a machine having a different number of rotor and stator poles. In particular, the principals disclosed herein may be used to construct a N*8/N*4 machine, a N*6/N*4 machine, or a N*8/N*6 machine where N is an integer, or any other operable stator pole/rotor pole combination.

The use of a reluctance machine in accordance with the present invention can allow for improved control topologies that can increase the toque output of the machine system. In particular, bi-polar power converters that allow the phase energization currents to vary in polarity can significantly increase the torque output of the machine system.

Figure 6:
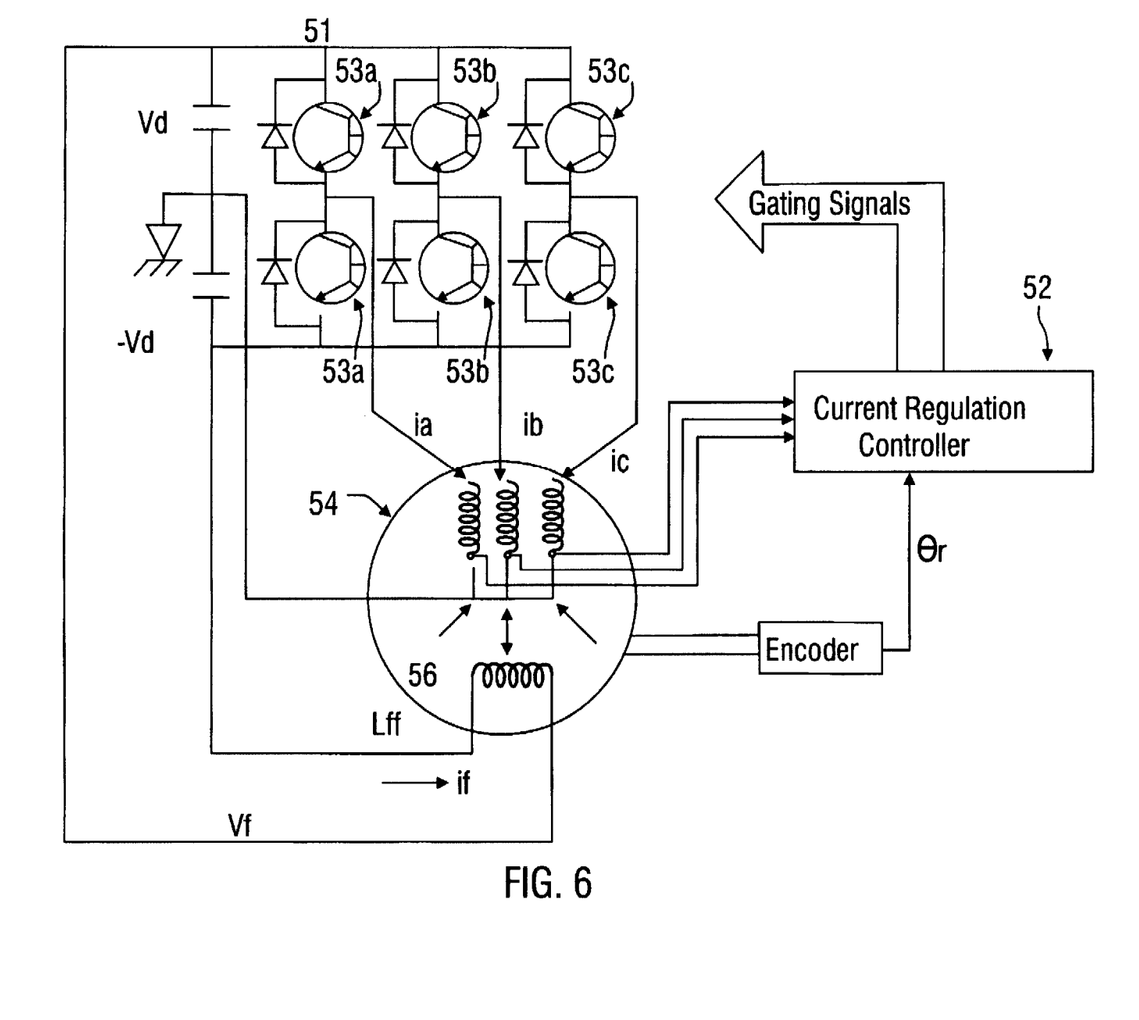
FIG. 6 illustrates a reluctance machine system in accordance with the present invention in which bi-polar phase energization currents are utilized.

FIG. 6 illustrates a machine control system 50 that may be used in conjunction with a reluctance machine according to the present invention (e.g., the machine of FIG. 4) to provide increased torque output. In general, the machine control system 50 comprises a bi-polar power converter 51 and a current regulation controller 52. Bi-polar power converter 51 in turn comprises power switching device pairs 53a, 53b and 53c that are coupled to the three phase windings a, b and c, of a reluctance machine 54 constructed in accordance with the present invention. The auxiliary field winding 56 of the machine 54 is coupled across the DC bus of power converter 51 such that the auxiliary winding is constantly energized so as to establish continuous currents in the auxiliary field winding and a substantially constant magnetic field in the machine.

Because the auxiliary field winding in the system of FIG. 6 establishes a stable magnetic field in the machine, the torque produced by the rotor will be a function both of the reluctance torque and torque produced by the relationship between the flux linking the auxiliary field winding and the energized phase. Mathematically, the total torque can be expressed as a combination of the reluctance torque plus the "flux-linking" torque as follows:

$$T_{phase} = 1/2 i_{phase}^2 \frac{dL}{d\theta} + i_{phase} \frac{d\psi}{d\theta}$$

where $$\frac{d\psi}{d\theta}$$

is the derivative of the change in the flux linking the auxiliary field to the energized phase winding as a function of the rotor's position.

By properly controlling the phase current though the use of bi-polar current control, improved torque performance can be established.

Figure 7:
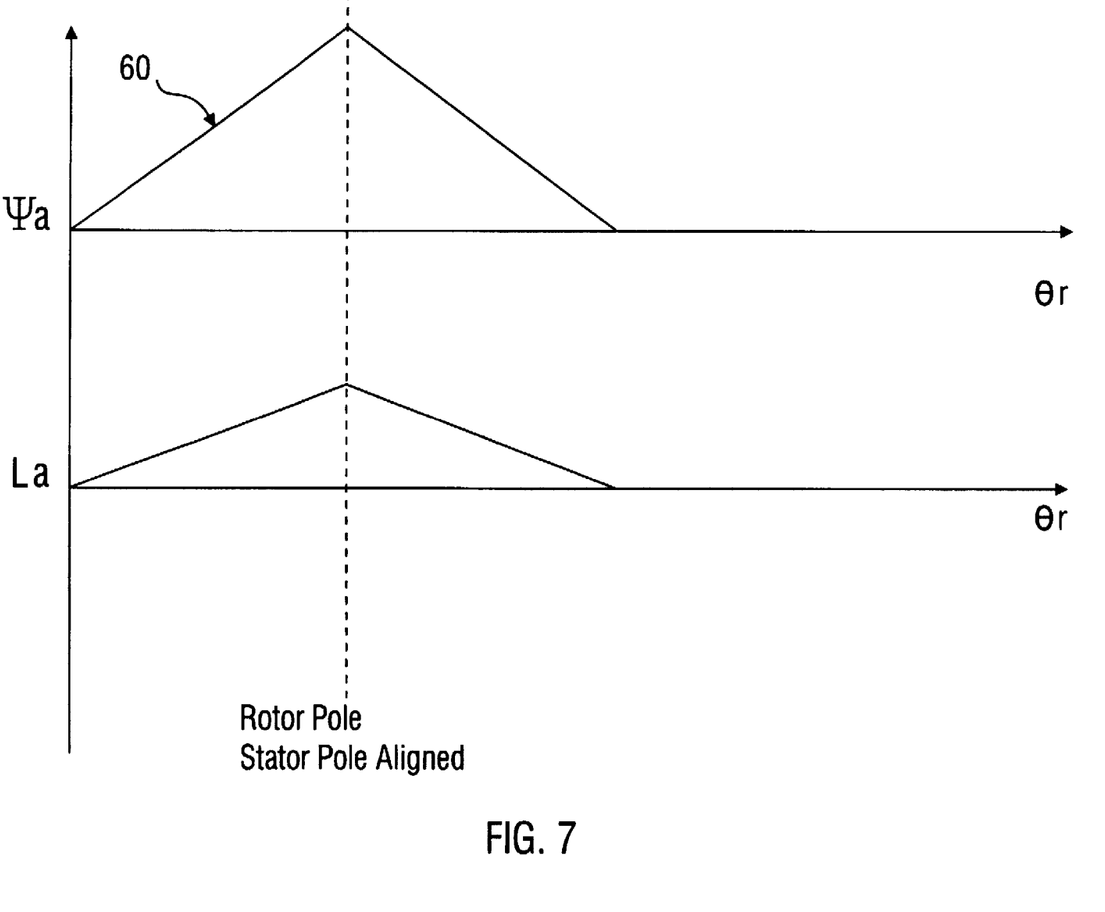
FIG. 7 illustrates the flux linking phase winding A of the machine system of FIG. 6 with the auxiliary winding and the self inductance of phase winding A.

FIG. 7 illustrates several characteristics of the machine system of FIG. 6 for a representative phase winding for a constant auxiliary field current including: (i) the flux linking the auxiliary field winding and the phase winding as a function of rotor position 60 and (ii) the self inductance L of the phase as a function of rotor position 62. Referring to the flux linkage illustration 60 of FIG. 7, it may be noted that the flux linkage increases as a rotor pole becomes aligned with an energized stator pole (providing a positive $$\frac{d\psi}{d\theta}\text{ )}$$

and decreases thereafter (providing a negative $$\frac{d\psi}{d\theta}\text{ ).}$$

The self inductance of the phase winding L, illustration 62, indicates that the self inductance characteristics vary in a manner similar to the flux linkages 60.

Referring back to the equation for total phase torque in the system of FIG. 6 it may be noted that the reluctance torque is a function of the current squared multiplied by the derivative of the self inductance of the phase as a function of the rotor's position. As such, changes in the polarity of the phase current should not affect the reluctance torque of the system. The "flux-linking" torque, however is a function of both the phase current and the derivative of the flux linkage. As such, if the magnitude of the phase current is adjusted from a positive value to a negative value at the point in which the flux linkage stops increasing and begins to decrease, positive flux linkage torque can always be produced. Moreover, because the flux linkage can be established such that the sum of the flux linkage torque and the reluctance torque is always positive, even when the $$\frac{dL}{d\theta}$$

is negative, positive torque can always be obtained.

Figure 8:
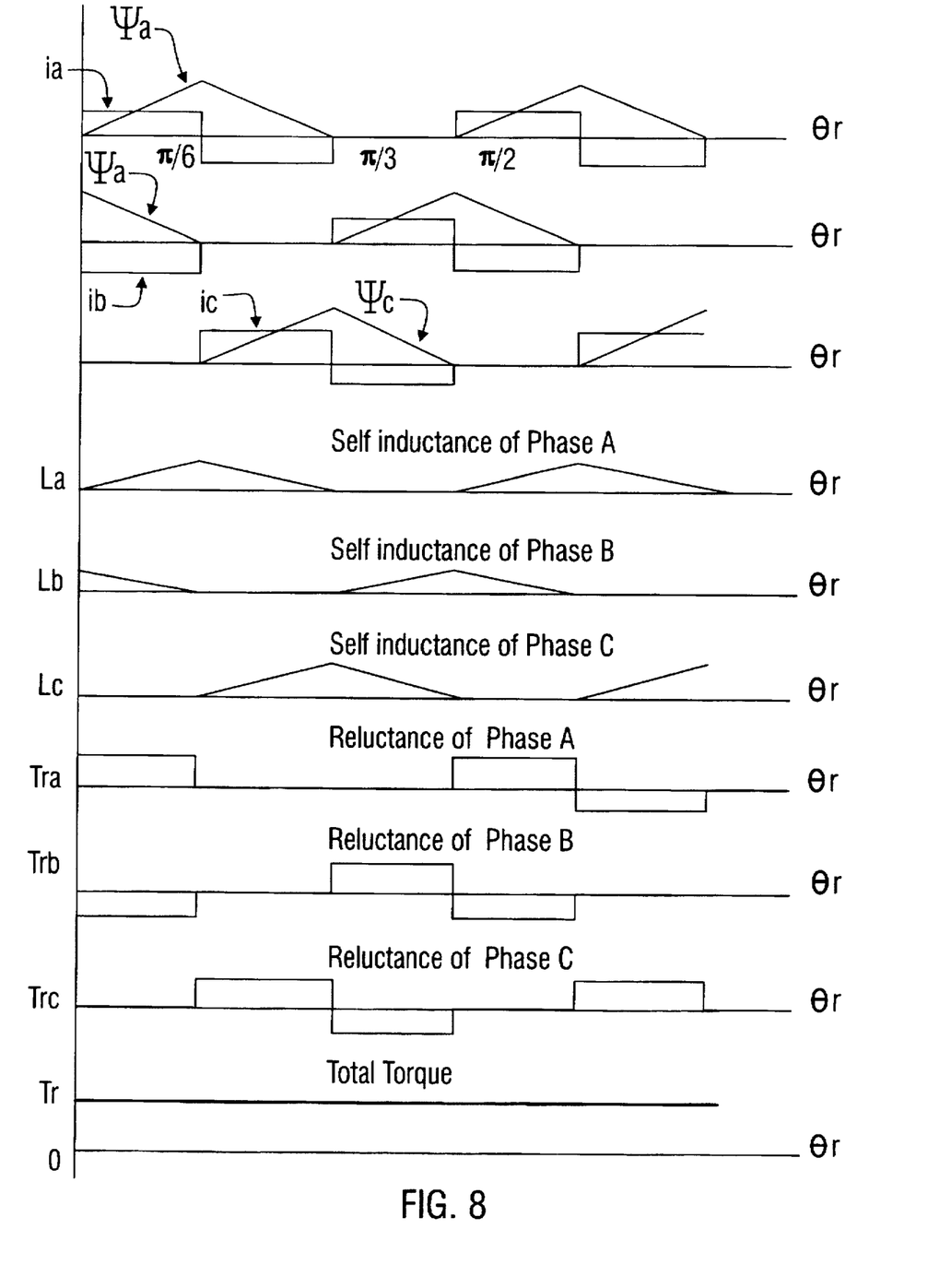
FIG. 8 illustrates the flux linkages, phase inductances, and phase currents for the machine system of FIG. 6.

This operating characteristic of the system of FIG. 6 is generally illustrated in FIG. 8 which illustrates the waveforms of FIG. 7 for all three phases, as well as the individual phase currents. As these figures indicate, the system of FIG. 6 may be used to increase the average torque output and to allow for the overlapping energization of the various phase windings. While this system requires a relatively complex power converter to allow for the establishment of bi-directional currents in the phase windings, it provides performance advantages in the form of increased torque output.

The construction of a current controller to provide the current waveforms of FIG. 8 is believed to be well within the ability of a person of ordinary skill in the motor art having the benefit of this disclosure. As such it is not addressed in detail herein. Moreover, it should be noted that the system and control techniques discussed above in connection with FIG. 6 are not limited to the particular 6/4 reluctance machine of FIG. 4 but can be used in connection with different machines having different stator pole/rotor pole combinations.

The above description of several exemplary embodiments is made by way of example and not for purposes of limitation. Many variations may be made to the embodiments and methods disclosed herein without departing from the scope and spirit of the present invention. The present invention is intended to be limited only by the scope and spirit of the following claims.

I claim as my invention:

1. A reluctance machine system comprising:
   (a) a reluctance machine including:
      a stator defining a plurality of stator poles;
      a rotor defining a plurality of rotor poles, the rotor being mounted for rotation with respect to the stator, the stator poles and the rotor poles being configured such that the total area of overlap between the rotor and stator poles is constant as the rotor rotates with respect to the stator;
      at least N, separately energizable phase windings, where N is an integer greater than 2, each phase winding including a plurality of winding coils, where each winding coil surrounds a stator pole;
      a full pitch auxiliary field winding, the auxiliary field winding comprising one or more full pitched coils, where each full pitched coil encircles a group of N stator poles, and wherein the group includes, for each of the N phase windings, a stator pole surrounded by a winding coil from that phase winding; and
   (b) a power converter coupled to the reluctance machine, the power converter including:
      a DC bus;
      power switching devices coupling the phase windings to the DC bus for providing phase energization currents to the phase windings; and
      circuitry for providing continuous energization current to the auxiliary field winding, wherein the magnetic flux produced by the auxiliary field winding is relatively constant.

2. The reluctance machine system of claim 1 wherein the rotor defines eight rotor poles, the stator defines twelve stator poles, wherein the there are three phase windings and wherein the auxiliary winding includes at least one winding coil surrounding three stator poles.

3. The reluctance machine system of claim 1 wherein the rotor defines four rotor poles, the stator defines six stator poles and wherein the auxiliary winding includes at least one winding coil surrounding three stator poles.

4. The reluctance machine system of claim 1 wherein the stator poles are defined by a plurality of slots defined by the stator and wherein the auxiliary winding is positioned within at least two of the slots.

5. The reluctance machine system of claim 4 wherein the slots containing the auxiliary winding are deeper than the slots that do not contain the auxiliary winding.

6. The reluctance machine system of claim 5 wherein the slots containing the auxiliary winding are substantially Y-shaped.

7. The reluctance machine system of claim 1 wherein the auxiliary field winding comprises a plurality of winding coils connected in series.

8. The reluctance machine system of claim 1 wherein the auxiliary field winding comprises at least one winding coil and where the number of winding turns in the auxiliary field coil is the same as the number of turns of a phase winding coil.

9. The reluctance machine system of claim 1 wherein the power switching devices are coupled to switching circuitry to provide discontinuous energization currents to the phase windings.

10. The reluctance machine system of claim 9 wherein the discontinuous currents provided to the phase windings comprises current pulses of a substantially trapezoidal shape.

11. The reluctance machine system of claim 10 wherein the average peak magnitude of the trapezoidal current pulses is the same as the average peak magnitude of the continuous current provided to the auxiliary field windings.

12. The reluctance machine system of claim 1 wherein the circuitry for providing continuous energization current to the auxiliary field winding comprises electrical connections for coupling the auxiliary field winding across a source of substantially constant DC voltage.

13. The reluctance machine system of claim 12 wherein the source of substantially constant DC voltage is the DC bus of the power converter.

14. The reluctance machine system of claim 12 further including a power switching device coupling the auxiliary field winding to the electrical connections, wherein the switching signals for the power switching device may be controlled to regulate the magnitude of the continuous current in the auxiliary field winding.

15. The reluctance machine system of claim 12 further including a circuit for providing switching signals to the power switching device to control the torque output of the machine.

16. A reluctance machine system comprising:
   (a) a reluctance machine including:
      a stator defining a N*6 stator poles, where N is an integer;
      a rotor defining a N*4 rotor poles, the rotor being mounted for rotation with respect to the stator;
      three phase windings, each phase winding including a plurality of winding coils, wherein each winding coil surrounds a stator pole;
      a full pitch auxiliary field winding, the auxiliary field winding comprising at least one full pitch auxiliary winding coil surrounding a group of 3 stator poles, and wherein the group includes, for each of the phase windings, a stator pole surrounded by a winding coil from that phase winding; and
   (b) circuitry for providing continuous energization current to the auxiliary field winding.

17. The reluctance machine system of claim 16 wherein N equals 2.

18. The reluctance machine system of claim 16 wherein N equals 1.

19. The reluctance machine system of claim 16 wherein the circuitry for providing continuous energization current to the auxiliary field winding comprises electrical connections coupled to a series connection of the auxiliary field winding and a variable resistor.

20. A reluctance machine system comprising:
   (a) a reluctance machine including:
      a stator defining a N*8 stator poles, where N is an integer;
      a rotor defining a N*6 rotor poles, the rotor being mounted for rotation with respect to the stator;
      four phase windings, each phase winding including a plurality of winding coils, wherein each winding coil surrounds a stator pole;
      a full pitch auxiliary field winding, the auxiliary field winding comprising at least one full pitch auxiliary winding coil surrounding a group of 4 stator poles, and wherein the group includes, for each of the phase windings, a stator pole surrounded by a winding coil from that phase winding; and
   (b) circuitry for providing continuous energization current to the auxiliary field winding.

21. The reluctance machine system of claim 20 wherein N equals 1.

13

22. The reluctance machine system of claim 20 wherein N equals 2.

23. A reluctance machine system comprising:

a reluctance machine comprising a rotor, a stator defining a plurality of stator poles, at least N separately energizable phase windings. N being an integer greater than 2.

wherein each phase winding surrounds a plurality of non-adjacent stator poles and wherein each stator pole surrounded by a given phase winding is separated from each other stator pole surrounded by the given phase winding by at least two stator poles;

the stator poles being configured in relation to a plurality of rotor poles such that the total area of overlap between the rotor and stator poles is constant as the rotor rotates with respect to the stator;

a full pitch auxiliary winding, wherein the full pitch auxiliary winding comprises at least one full pitch coil, wherein the full pitch coil encircles a group of N stator poles and where the group includes, for each of the N phase windings, at least one stator pole encircled by that phase winding; and circuitry for maintaining constant current in the auxiliary winding during normal operation of the machine, wherein the magnetic flux produced by the auxiliary field windings is relatively constant.

24. The reluctance machine system of claim 23 wherein the circuitry for maintaining constant current in the auxiliary winding comprises a source of DC voltage.

25. The reluctance machine system of claim 24 wherein the source of DC voltage provides a substantially constant DC voltage to the auxiliary winding.

26. A reluctance motor system comprising:

a reluctance machine including a rotor, a stator, a plurality of phase windings and a full pitch auxiliary winding;

circuitry for energizing one or more of the phase windings with bi-polar current as a function of the rotor's position with respect to the stator;

circuitry for energizing the auxiliary winding with uni-polar current so as to maintain continuous current in the auxiliary winding, wherein the magnetic flux produced by the auxiliary field winding is relatively constant.

27. The reluctance machine system of claim 26 wherein there are N phase windings, where N is an integer and wherein the auxiliary winding comprises a winding coil surrounding N stator poles.

28. A method of energizing a reluctance motor including a plurality of phase windings and a full pitch auxiliary winding, the method comprising the steps of:

energizing the phase winding with bi-polar current as a function of the rotor's position with respect to the stator; and energizing the auxiliary winding with uni-polar current so as to maintain continuous current in the auxiliary winding, producing relatively constant magnetic flux in the auxiliary field winding.

29. A reluctance machine system comprising:

(a) a reluctance machine including:

a stator defining a plurality of stator poles;

a rotor defining a plurality of rotor poles, the rotor being mounted for rotation with respect to the stator;

a plurality of phase windings, each phase winding including a plurality of winding coils, where each winding coil surrounds a stator pole;

a full pitch auxiliary field winding, the auxiliary field winding surrounding a plurality of stator poles; and (b) a bi-polar power converter coupled to the reluctance machine, the power converter including:

a DC bus;

power switching devices coupling the phase windings to the DC bus for providing phase energization currents to the phase windings, where the phase energization currents vary in polarity over time and circuitry for providing continuous energization current to the auxiliary field winding, wherein the magnetic flux produced by the auxiliary field winding is relatively constant.

30. The reluctance machine system of claim 29 wherein the power switching devices are controlled such that the polarity of the phase energization current for a given winding changes approximately when the inductance for the phase winding is at its maximum.

31. The reluctance machine system of claim 30 wherein the current in a given phase winding is controlled such that the phase current is positive when the inductance for the phase winding is increasing and negative when the inductance for the phase winding is decreasing.

* * * * *